United States Patent [19]

Westby

[11] 4,404,975
[45] Sep. 20, 1983

[54] ROCK TRAP FOR A COMBINE

[76] Inventor: Roger L. Westby, Rte. 2, New Rockford, N. Dak. 58356

[21] Appl. No.: 324,762

[22] Filed: Nov. 25, 1981

[51] Int. Cl.³ ............................................. A01F 12/16
[52] U.S. Cl. ................................................ 130/27 JT
[58] Field of Search .......................... 130/27 JT, 27 J; 292/264, 262; 49/382; 222/517; 110/116, 118, 108

[56] References Cited

U.S. PATENT DOCUMENTS

| 2,150,753 | 3/1939 | Weinstein | 222/517 |
| 2,604,675 | 7/1952 | Seaman | 49/386 |
| 2,718,335 | 9/1955 | Shippen | 222/517 |
| 3,576,188 | 4/1971 | Tanis | 130/27 JT |
| 3,576,188 | 4/1971 | Tanis | 130/27 JT |
| 3,643,666 | 2/1972 | Denison | 130/27 JT |
| 3,645,269 | 2/1972 | Peruski | 130/27 JT |
| 3,648,709 | 3/1972 | DeCoene | 130/27 JT |
| 3,664,348 | 5/1972 | Maiste et al. | 130/27 JT |
| 3,756,248 | 9/1973 | Mathews | 130/27 JT |
| 3,771,530 | 11/1973 | Wassell | 130/27 JT |
| 4,209,024 | 6/1980 | Powell | 130/27 T |

FOREIGN PATENT DOCUMENTS 1400055  7/1975  United Kingdom ............ 130/27 JT

Primary Examiner—Jay N. Eskovitz
Attorney, Agent, or Firm—Zarley, McKee, Thomte, Voorhees & Sease

[57] ABSTRACT

A rock trap for a combine is described wherein the rock trap is positioned below the upper rearward end of the combine feeder housing. The rock trap comprises a panel which is pivotally connected at its rearward end to the combine and embraces the underside of the rearward end of the feeder housing. The panel has an opening formed therein which communicates with a rock trap box which extends downwardly from the panel. The lower end of the rock trap box is selectively closed by a pivotal cover which may be manually opened to dump rocks which have accumulated therein.

1 Claim, 4 Drawing Figures

ROCK TRAP FOR A COMBINE

BACKGROUND OF THE INVENTION

This invention relates to a rock trap for a combine and more particularly to a rock trap which is specifically designed for International Harvester axial-flow combines.

A large number of prior art devices have been provided to prevent rocks from entering the threshing cylinder and concave areas of combines. Typical of such prior art devices are those disclosed in U.S. Pat. Nos. 3,771,530; 3,756,248; 3,645,269; 3,643,666; and 3,576,188.

A problem associated with all of the prior art devices is that incoming rocks are not prevented from coming into engagement with the cylinder or concave of the combine. A further problem associated with the prior art devices is the removal of stones or rocks accumulated in the rock traps. A still further problem associated with the prior art devices is that the combine must be extensively modified to provide the rock trap. A still further shortcoming of the prior art is that the devices known to applicant are designed to be used with conventional cylinder and concave threshing arrangements and are not designed to be used in connection with axial-flow type combines.

Therefore, it is a principal object of the invention to provide an improved rock trap for a combine.

A further object of the invention is to provide a rock trap for a combine which prevents rocks from coming into contact with the rotor.

A still further object of the invention is to provide a rock trap for a combine which may be conveniently dumped to remove rocks accumulated therein.

A still further object of the invention is to provide a rock trap for a combine which may be mounted on the combine without extensive modification thereof.

A still further object of the invention is to provide a rock trap for a combine which is specifically designed for International Harvester axial-flow combines.

These and other objects will be apparent to those skilled in the art.

SUMMARY OF THE INVENTION

A rock trap for a combine is described which is positioned between the upper end of the feeder housing and the grain inlet opening forwardly of the threshing rotor. A panel is pivotally connected at its rearward end to the combine below the grain inlet opening and embraces the underside of the upper end of the feeder housing. The panel is provided with a transversely extending opening formed therein which is in communication with a rock trap box extending downwardly therefrom. The lower end of the rock trap box is selectively closed by a spring-loaded door which may be manually opened to dump rocks accumulated in the box.

DESCRIPTION OF THE PREFERRED EMBODIMENT

Figure 1:
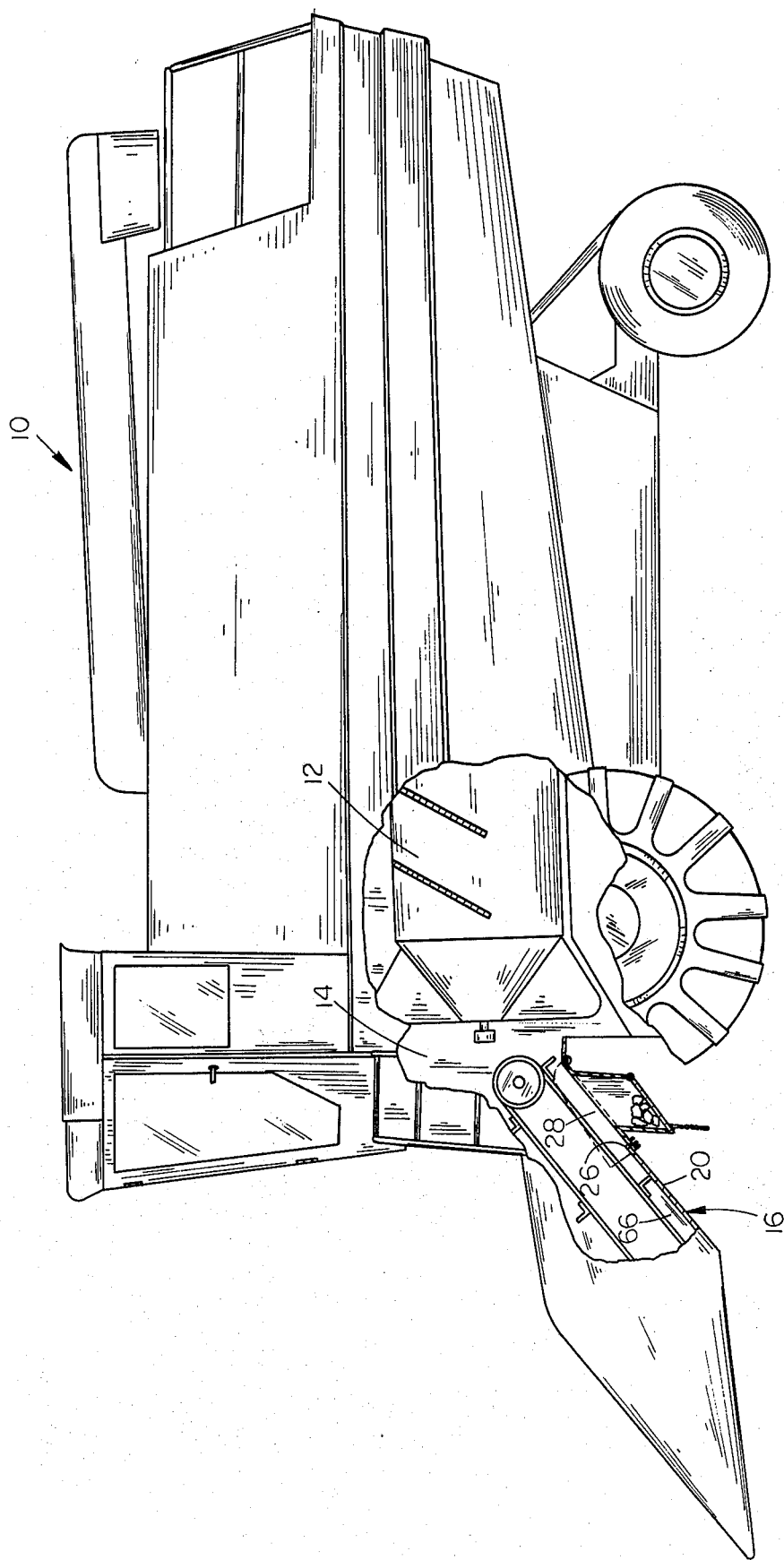
FIG. 1 is a side view of a combine having portions thereof cut away to illustrate the rock trap invention.
Figure 2:
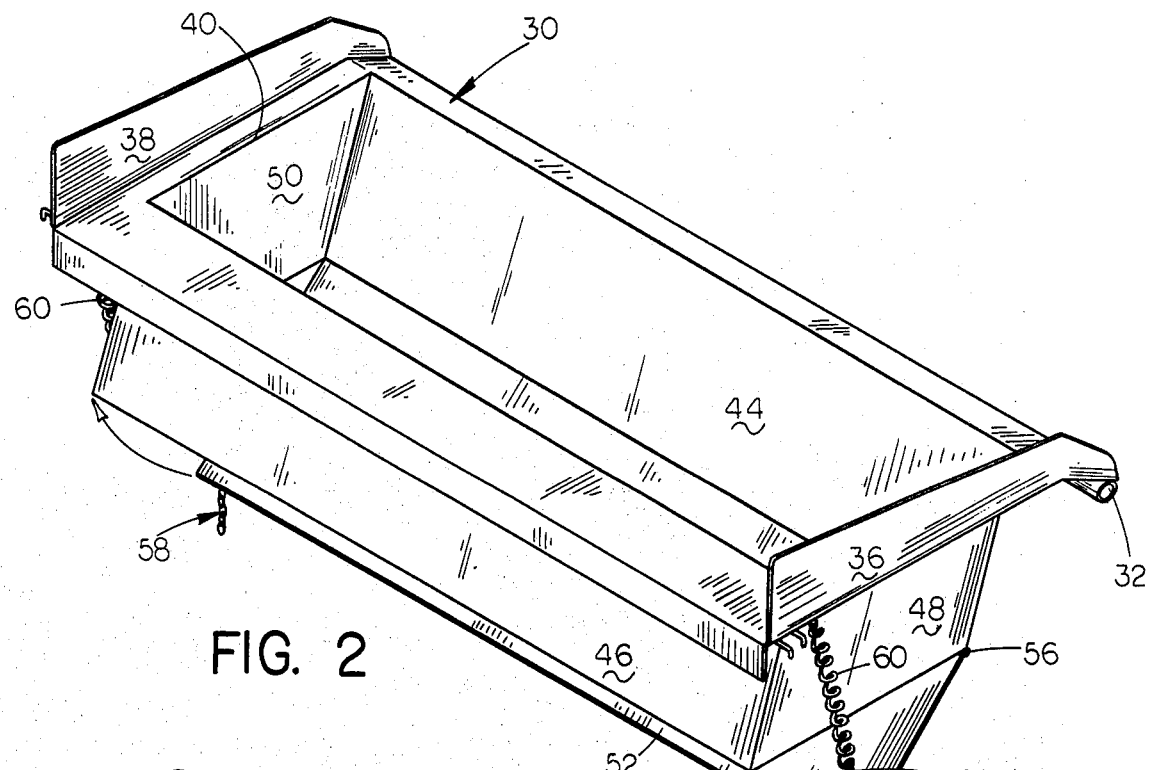
FIG. 2 is a front perspective view of the rock trap of this invention.
Figure 3:
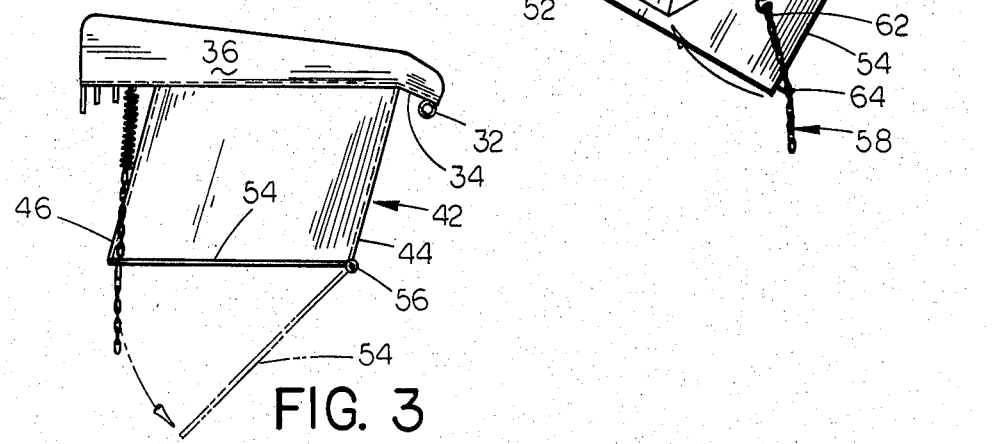
FIG. 3 is an end elevational view of the rock trap with the broken lines illustrating the cover in its open position.
Figure 4:
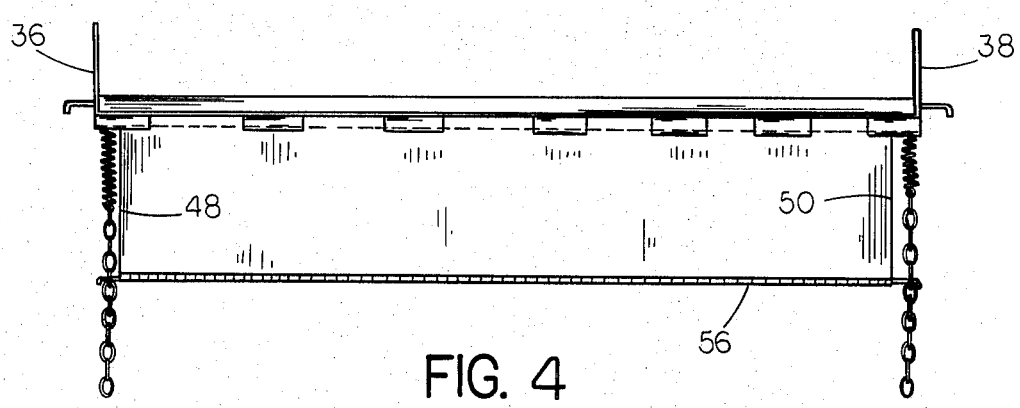
FIG. 4 is a rear view of the rock trap.

In the drawings, the numeral 10 refers generally to a combine such as an International Harvester axial-flow combine including rotor 12 which is positioned rearwardly of a crop inlet opening 14. The numeral 16 refers to a feeder housing which is pivotally secured to the combine 10 so that its discharge end communicates with the inlet opening 14 to feed grain or crop to the rotor 12 in conventional fashion. As seen in FIG. 1, feeder housing 16 includes a bottom wall 20. As seen in FIG. 1, the rearward end of bottom wall 20 terminates at 26 which is spaced forwardly from the crop inlet opening 14 to define a rock gathering area 28 extending transversely across the rearward end of the feeder housing 16.

The numeral 30 refers to a panel which is a conventional part, except for the opening to be described hereinafter, of the International Harvester axial-flow combines such as Model Nos. 1420, 1440, 1460, 1480 and 1482. The panel 30 is sometimes referred to as a rock or stone retarder tray or panel and is pivotally connected at its upper end 32 to the combine at a point just below the inlet opening 14. Panel 30 includes a bottom portion 34 and side wall portions 36 and 38 which extend upwardly from the opposite sides of bottom 34. As seen in the drawings, the forward or lower end of panel 30 is positioned below bottom wall 20 to cover the rock gathering area 28. The side walls 36 and 38 embrace the lower portions of the side walls of the feeder housing 16 in conventional fashion. Panel 30 is normally maintained in position by a spring means so that the panel 30 pivotally moves with the feeder housing 16 during the combining operation.

It is the panel 30 which is modified in accordance with the invention disclosed herein to more effectively and efficiently provide a rock trap for the combine. Bottom 34 of panel 30 is provided with a rectangular opening 40 which extends substantially between the side walls 36 and 38. The numeral 42 refers to a rock trap box which is secured to the panel 30 below opening 40. Rock trap box 42 comprises a back wall 44, front wall 46, opposite side walls 48 and 50 and an open lower end 52 which is selectively closed by a cover 54 which is pivotally secured at its rearward end to the lower end of back wall 44 at 56.

A pull chain assembly 58 is provided at each side of the rock trap box and comprises a spring 60 secured at one end to panel 30 and having a chain 62 extending from the other end thereof. Chain 62 is secured to an arm 64 extending laterally from cover 54 so that a portion of the chain is positioned below the arm 64. In operation, grain is supplied to the feeder housing in conventional fashion and moves upwardly in the feeder housing in the area generally indicated by the reference numeral 66. As the grain passes over bottom 34 of panel 30, rocks in the grain will fall downwardly through the opening 40 into the rock trap box 42. The combine operator will periodically dump rocks accumulated in the rock trap box 42 by simply pulling on either or both of the pull chain assemblies 58 to pivotally move the cover 54 from the closed position to the open position. When the cover 54 is moved to the open position, rocks accumulated in the rock trap box 42 will fall downwardly therefrom. It can be appreciated that the rock trap of this invention is very accessible and may be added to existing combines without excessive modification thereof.

It can also be seen the position of the rock trap box is such that rocks will be accumulated therein prior to the rocks coming into contact with the rotor 12 thereby preventing damage to the rotor. Thus it can be seen that the rock trap of this invention accomplishes at least all of its stated objectives.

I claim:

1. In combination, a crop harvester including a crop threshing means having rearward and forward ends, a feeder housing means, having rearward and forward ends, pivotally mounted on said crop harvester so that its rearward end is in communication with said crop threshing means, and a crop gathering means at the forward end of said feeder housing, said feeder housing comprising a top wall, a bottom wall, and opposite side walls, said bottom wall having its rearward end terminating forwardly of said crop threshing means to define an opening between the rearward end of said feeder housing and said crop threshing means, a stone retarder panel having rearward and forward ends, said panel being pivotally secured, at its rearward end, to said crop harvester, said panel embracing the underside of the upper end of said feeder housing to close said opening, means securing the forward end of said panel to said feeder housing whereby said panel will pivotally move with said feeder housing, said panel comprising a rectangular bottom portion having rearward and forward ends and opposite side wall portions which extend upwardly therefrom adapted to embrace said feeder housing, said bottom portion of said panel having a rectangular opening formed therein, and a rock trap box means secured to said panel positioned below said rectangular opening for receiving rocks therein which are moving upwardly in said feeder housing means towards said crop threshing means, said rock trap box means having an interior rock compartment which is in communication with the interior of said feeder housing, said rock trap box means having a lower end which is selectively closed by a spring loaded door means, said lower end of said rock trap box being selectively opened to permit rocks accumulated therein to be dumped on the ground.

* * * * *